United States Patent [19]
Millner et al.

[11] Patent Number: 5,428,522
[45] Date of Patent: Jun. 27, 1995

[54] FOUR QUADRANT UNIPOLAR PULSE WIDTH MODULATED INVERTER

[75] Inventors: Alan Millner, Lexington; Peter P. Mongeau, Westborough; Zaher Daboussi, Boylston, all of Mass.

[73] Assignee: Kaman Electromagnetics Corporation, Hudson, Mass.

[21] Appl. No.: 931,196

[22] Filed: Aug. 17, 1992

[51] Int. Cl.⁶ .............................................. H02P 1/00
[52] U.S. Cl. ...................................................... 363/63
[58] Field of Search ........................... 363/63; 318/599

[56] References Cited

U.S. PATENT DOCUMENTS

| | | | |
|---|---|---|---|
| 3,739,158 | 6/1973 | Woodward | 363/63 |
| 4,368,411 | 1/1983 | Kidd | 318/254 |
| 4,388,571 | 6/1983 | Tada et al. | 318/293 |
| 4,477,751 | 10/1984 | Kanayama | 318/280 |
| 4,494,181 | 1/1985 | Ramlohr et al. | 363/63 |
| 4,523,134 | 6/1985 | Kinoshita et al. | 318/599 |
| 4,562,393 | 12/1985 | Loyzim et al. | 318/599 |
| 4,581,565 | 4/1986 | Van Pelt et al. | 318/294 |
| 4,591,767 | 5/1986 | Koide | 318/599 |
| 4,710,686 | 12/1987 | Guzik | 318/293 |
| 4,745,345 | 5/1988 | Petersen | 318/254 |
| 4,782,272 | 11/1988 | Buckley et al. | 318/599 |
| 4,794,312 | 12/1988 | Kano et al. | 318/599 |
| 4,901,366 | 2/1990 | Rottger | 388/811 |
| 5,153,492 | 10/1992 | Landseadel | 318/599 |

OTHER PUBLICATIONS

Simple Switching Control Method Changes Power Converter Into A Current Source—Cecil W. Deisch, 1978. IEEE.
The Synchronised/Limit Cycle Conductance Controller—D. O'Sullivan, A. Weinberg, D. Levins, J. Schreuders, 1980. IEEE.
IEEE Transactions on Industrial Electronics, vol. 37, No. 4, Aug.-1990—New Constant Frequency Current-Mode Control For Power Converters, Stable for All Values of Duty Ratio, and Usable for All Four Quadrants by V. Anunciada et al.
Current-Mode Control, Five Different Types, Used With the Three Basic Classes of Power Converters: Small-Signal Ac and Large-Signal Dc Characterization, Stability Requirements, and Implementation of Practical Circuits, 1985, by R. Redl et al.

Primary Examiner—Thomas M. Dougherty
Attorney, Agent, or Firm—McCormick, Paulding & Huber

[57] ABSTRACT

A four quadrant unipolar pulse width modulated (PWM) power conversion circuit for supplying a desired current to an inductive load uses an H-bridge circuit topology with an upper and lower pair of switching elements including a diode in parallel with each of the switching elements to provide a current path from the load to the power source when its respective switching element is non-conductive. A control algorithm generates switching element control signals to cause the instantaneous voltage across the load to alternate between a single polarity voltage and zero for a portion of the output load waveform to cause the average value of the load current to correspond generally with the desired average load current.

6 Claims, 5 Drawing Sheets

FOUR QUADRANT UNIPOLAR PULSE WIDTH MODULATED INVERTER

BACKGROUND OF THE INVENTION

The present invention relates to control systems and methods for controlling current in an inductive load in the case of a motor or for controlling voltage in the case of a generator, and deals more particularly with a four quadrant unipolar pulse width modulated inverter with which a novel control algorithm is used.

It is well established in the art to use switch mode power conversion techniques for power supplies (DC to DC or AC to DC) and for controlling motor drives. Switch mode power conversion circuits typically use only filter and switch components, that is, inductive and capacitive elements and switch elements which function as either short circuits or open circuits. In the ideal case, there is no power dissipation in the converter. In reality, ideal switch elements do not exist but modern switching devices such as transistors, metal oxide semiconductor field effect transistors (MOSFETS), silicon controlled rectifiers (SCR), gate turnoff (GTO), and other switching devices approximate nearly ideal switching devices provided the number of switch transitions per second is limited. As a consequence, the final circuit design is a result of a set of tradeoffs wherein faster switching frequency results in the ability to use smaller filter components and achieves lower ripple in the controlled variable (current or voltage) but at the penalty of higher switch dissipation requiring larger switching devices which are slower and therefore more limited in frequency.

Although there are numerous and well-known methods for controlling switching devices, pulse width modulation (PWM) techniques are generally preferred because the on-time that the switching device is conducting is changed to match the load demand for power.

Early pulse width modulation controls, generally referred to as voltage mode control, used an averaged value of the output variable which generally was a voltage to determine the pulse width needed.

One of the original current mode control techniques is disclosed in a paper titled "Simple Switching Control Method Changes Power Converter into a Current Source" by Cecil W. Deisch published in 1978 by the IEEE. Deisch discloses a current mode control technique which allows very rapid control response to the current thereby simplifying control stabilization and enabling faster control response to disturbances. Deisch also discloses that there tended to be an instability in a constant frequency current threshold control circuit having duty cycles greater than fifty percent and in these instances proposed that the problem be resolved by utilization of ramp compensation which resulted in a compromise in performance.

U.S. Pat. No. 4,901,366 titled "Circuit Arrangement for the Timed Control of Semiconductor Switches" issued Feb. 13, 1990 to Rottger discloses the use of a full bridge driving an ohmic-inductive load using a PWM technique with unipolar control wherein only one switching element is pulse width modulated to reduce switching losses.

The paper, "Current Mode Control, Five Different Types, Used with the Three Basic Classes of power Converters, Small Signal AC and Large Signal DC Characterization, Stability Requirements, and Implementation of Practical Circuits" by Reidl and Sokal published in 1985 uses current mode controllers for DC to DC converters using hysteretic clocked-on or clocked-off control. Because most DC to DC converters have either a positive output polarity or a negative output polarity but never have to reverse polarities, the reference does not address the problems of applying the technique to a brushless DC motor drive.

The U.S. Pat. No. 4,388,571 titled "Control Circuit for Automobile Electro-magnet Drive Equipment" issued Jun. 14, 1983 to Tada et al. discloses a full bridge which can apply either a positive or a negative polarity voltage to the load wherein one polarity corresponds to the "on" half of the duty cycle of a PWM DC-to-DC controller and the opposite polarity corresponds to the other part of the duty cycle, thus the term bipolar pulse width modulation. Tada discloses the use of a hysteresis band for the controlled variable so that as the variable approached and reached the edge of the band in one direction, the opposite polarity is applied to the bridge to bring the variable in the opposite direction. Tada is useful with DC brush-type motors which have either a positive output for rotation in one direction and a negative output for rotation in the other direction wherein transitions are not a concern. However, when the technique proposed by Tada is applied to all motor drives, it suffers from high switch heat dissipation and exhibits current ripple due to the bipolar drive and also requires synchronization of operation to a single clock at a constant frequency in order to address noise considerations.

The paper entitled "New Constant—Frequency Current—Mode Control for Power Converters, Stable for all Values of Duty Ratio, and Usable in all Four Quadrants" by Anunciada and Silva published in the IEEE Transaction on Industrial Electronics in 1990 discloses the use of a control band around the desired current waveform and the use of dual clock synchronous control over all duty cycle values using a full bridge drive.

Typically, bipolar drive dissipates a great deal of power in non-ideal switching devices. The U.S. Pat. No. 4,477,751 entitled "Motor Brake Device" issued Oct. 16, 1984 to Kanayama discloses the use of a unipolar/bipolar mode PWM control which introduces an alternation during a PWM cycle between one voltage across the load and zero volts across the load instead of bipolar drive alternating between one voltage and its opposite polarity voltage. The result is a lower ripple current in the load, smaller filter components, and lower switch dissipation.

Quadrants may be defined in the voltage and current graph of the load. A positive voltage and positive current is a motor operation which may be either unipolar (one polarity of source voltage applied, alternating with zero voltage applied) or may be bipolar (alternating positive and negative source voltage applied). Reversing the voltage while maintaining the current positive extracts energy from the motor and over short periods reduces the current and over longer periods makes the motor run backwards as a generator. The second and fourth quadrants are thus defined as reversed voltage and reversed current polarity of the load, respectively. The third quadrant represents motoring in the reverse direction and both voltage and current are reversed. Motor controls dealing with a brush-type motor are not concerned with transitions between quadrants since the controls operate in a steady state in one direction or the other direction.

The U.S. Pat. No. 4,562,393 entitled "Modulation Scheme for PWM-type Amplifiers or Motors" issued Dec. 31, 1985 to Loyzim et al. discloses a bipolar PWM control using a bandgap technique, similar to that described in the Anunciada and Silva reference, to drive a brush-type motor. Loyzim does not describe or disclose a unipolar PWM nor does Loyzim address quadrant transition problems.

The U.S. Pat. No. 4,710,868 entitled "Method and Apparatus for Control of Current in a Motor Winding" issued Dec. 1, 1987 to Guzik discloses a unipolar PWM controller for use with a brushless DC motor and Guzik attempts to resolve problems associated with transition between quadrants during which time the current is steeply decreasing and causes loss of control. Guzik discloses a voltage mode control and thus loses the control response advantages of current mode PWM. In order to compensate for the use of voltage mode control, Guzik employs a single turn-on clock rather than the dual clock technique disclosed in the Anunciada and Silva reference. Guzik does not disclose the use of a current band or the possibility for a cycle-by-cycle current control which is an important fault tolerance and reliability consideration. Guzik discloses changing the quadrants with a unipolar PWM control by observing the duty cycle of the PWM to determine if the duty cycle goes to zero or one hundred percent and in which case a loss of control is indicated. At such detection the control changes to select another quadrant to apply the reverse voltage.

It is therefore a general aim of the present invention to provide a control for a full bridge power circuit for driving brushless DC motors which controls current in the inductive load, minimizes switching losses in the bridge switching devices, and avoids loss of control of the current at difficult points in the control waveform such as at zero crossings or when the rate of change is steep.

SUMMARY OF THE INVENTION

A four quadrant unipolar pulse width modulated (PWM) power conversion circuit for supplying a desired current to an inductive load such as a motor uses an H-bridge circuit topology having an upper pair and lower pair of switching elements wherein the load is connected across a positive potential and negative potential DC power source. Diodes in parallel with each of the switching elements provide a current path from the load to the power source when its respective switching element is non-conductive. The value of the load current is compared to a desired load current and switching element control signals are generated in accordance with a control algorithm to cause the instantaneous voltage across the load to alternate between a single polarity voltage and zero for a portion of the output load waveform to cause the average value of the load current to correspond generally with the desired average load current.

In a further aspect of the invention, the desired average load current lies within a band or range of load current values defined by an upper limit boundary and a lower limit boundary.

BRIEF DESCRIPTION OF THE DRAWINGS

FIG. 6 shows the sequence of switching elements in accordance with the control algorithm of the present invention to maintain the current waveform within the desired band of operation and to control the direction of the current supplied to the motor winding;

wherein

DETAILED DESCRIPTION OF PREFERRED EMBODIMENTS

The conversion of a DC voltage to a regulated AC voltage for either a motor drive at a predetermined current waveform or for static power at a predetermined frequency and voltage waveform may be accomplished using a full bridge topology which is lossless if the switching devices are ideal. As stated above, switching devices typically have losses related to conductive drops and to switching energy and are less than ideal. The switching power loss is proportional to the bridge DC voltage, the load current, the switching frequency, the drive control algorithm and the device characteristics. A conventional bipolar drive, such as described by Anunciada and Silva in the above-mentioned reference, achieves constant switch frequency operation in a bidirectional (AC) current inverter by applying the DC bus voltage in either the positive polarity or negative polarity alternately across the load which effectively makes the DC bus voltage equal to double the actual DC bus value. As a result, the switching losses are proportional to double the DC bus voltage. The magnitude of the peak-to-peak ripple current which is a result of pulse width modulation, is also proportional to the DC bus voltage.

The algorithm of the present invention breaks the desired waveform into quadrants dependent on the signs of the average load current and voltage. In each quadrant, the required DC bus alternates with a short circuit across the load thus providing unipolar operation. The effective DC bus voltage is not doubled as in the case of bipolar operation thereby resulting in half the switching losses in the bridge switching elements as described above.

Known available unipolar PWM drives for servo or stepper motors are restricted to a single polarity of motor voltage. In contrast, the control embodying the present invention also features the ability to automatically determine the motor operating quadrant, that is, the required polarity of voltage and current, and to implement the switching sequence required to cause the bridge to operate in the determined quadrant.

Figure 1:
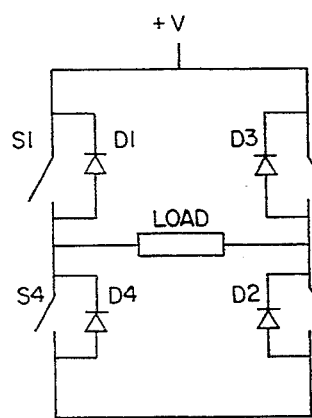
FIG. 1 shows a typical full H-bridge of the general type used in a motor drive system to supply current to a motor winding.
Figure 2:
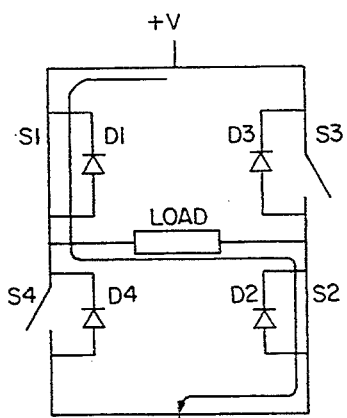
FIG. 2 shows the H-bridge of FIG. 1 in a positive voltage, positive current quadrant of operation.
Figure 3:
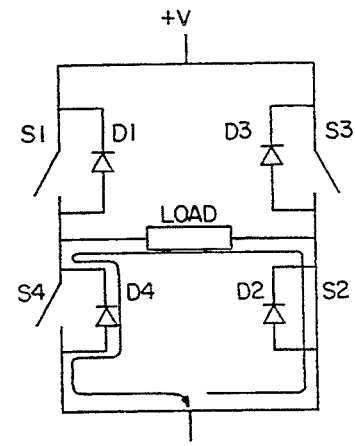
FIG. 3 shows the H-bridge of FIG. 1 with switching element S2 conductive to short circuit the load.
Figure 4:
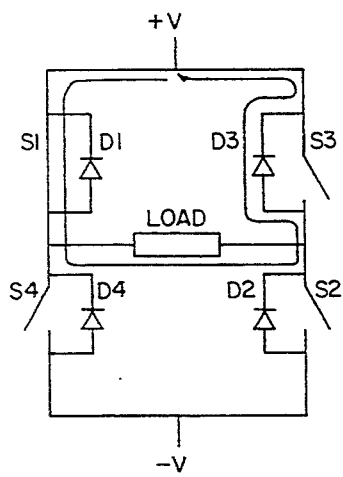
FIG. 4 shows the H-bridge of FIG. 1 with switching element S1 conductive to short circuit the load.

The control algorithm is compatible with standard clock operation to minimize the DC bus current ripple and torque ripple. An additional feature of the present invention avoids overheating of any one of the bridge switching devices while operating in the unipolar mode. A typical full H-bridge is illustrated in FIG. 1. If the bridge is in the positive voltage, positive current quadrant of operation, then on one PWM half cycle the switching elements S1 and S2 are actively closed or conductive. On the other half of the PWM cycle, the load is to be shorted. FIG. 2 illustrates the bridge of FIG. 1 wherein the switching elements S1 and S2 are actively closed and illustrates the resultant current path through the load. Shorting the load can be accomplished by opening switching element S1 which causes the diode D4 shunting switching element S4 to carry the current. The current path through switching element S2 and diode D4 is illustrated in FIG. 3. This control approach causes switching element S1 to switch every cycle while switching element S2 is always on and switching element S3 is always open or off. The result is that the switching element S1 operates at a higher temperature than any of the other switching elements S2, S3, S4. An alternate control method to short the load is to open switching element S2 and let diode D3 shunting switching element S3 carry the current in the current path as illustrated in FIG. 4. This alternate shorting configuration shifts the elevated temperature operating condition to the switching element S2. The control algorithm of the present invention alternates on successive PWM cycles between the shorting methods illustrated in FIGS. 3 and 4, respectively thereby spreading the heat dissipation among the switching elements rather than concentrating the heat in one switching element as in the prior art.

In order to implement the above control algorithm effectively in an environment with large electromagnetic transients and high power switches, the control must guarantee that no erroneous switch drive signals can result in a destructive condition, and that any erroneous control state is rapidly and automatically corrected.

Figure 5:
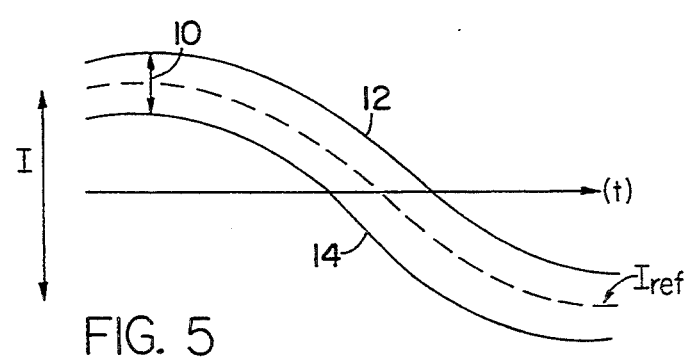
FIG. 5 illustrates a current waveform within a desired band of operation.

Now referring to FIG. 5, a current versus time waveform representative of the desired current waveform is illustrated wherein the desired current (or voltage if desired) signal is designated Iref and is a function of time. A band is defined by an upper limit boundary 12 above the Iref waveform and by a lower limit boundary 14 below the Iref waveform signal and is of sufficient width such that the load inductance does not allow limit-to-limit traversal of the band 10 in a single PWM clock period. For purposes of explanation and illustration of the control algorithm, the following definitions and conventions are adopted. The condition of the actual current exceeding the upper boundary 12 of the band 10 is defined as a logical signal HIGH=1 and the condition of the actual current falling below the lower boundary 14 of the band 10 is defined as a logical LOW=1. A clock pulse with its rising edge coinciding with a normally increasing current is defined as CLOCK A, and a (half period shifted) clock pulse coinciding with a normally falling current is defined as CLOCK B. The logic state of a current direction is designated as DIR=1 for a rising current. The unipolar voltage sign is designated by a logical VMODE=1 for a positive voltage and the sign of the reference load current is designated by IPOL=1 for a positive current. The use of switching elements S1 and S3 to short the load is designated by a logical OA=1, with the use of switching elements S2 and S4 being designated by OA=0. Also ( )\ designates the logical inverse of ( ), * designates a logical AND and + designates a logical OR.

The simplest algorithm for setting current direction is as follows: If the current is rising (DIR=1), and either HIGH=1 or Clock B, then set DIR=0. If DIR=0 and either LOW=1 or CLOCKA, then set DIR=1.

The simplest algorithm for changing VMODE is as follows: If LOW=1 and CLOCKB, then set VMODE=1. If HIGH=1 and CLOCKA, then set VMODE=0. If VMODE=1 then CLOCKA \ flips the state of OA. If VMODE=0 then CLOCKB \ flips the state of OA. The control algorithm can therefore be represented by the following expressions:

1.) S1=IPOL*(DIR*VMODE+OA*(DIR+-VMODE))
2.) S2=IPOL*(DIR*VMODE+OA \ *(DIR+-VMODE))
3.) S3=IPOL \ *((DIR*VMODE+OA\ *(DIR+VMODE)) \ )
4.) S4=IPOL \ *((DIR*VMODE+OA*(DIR+-VMODE)) \ )

The first term in each expression turns-on switching elements which impress a voltage of polarity VMODE across the load. The second term in each expression turns-on switching elements to short the load in a manner determined by OA. The current polarity is used to determine whether the diode is conducting thereby making the use of an active switching element unnecessary when the diode is conducting since each diode shunts a respective switching element.

A protective feature to avoid electromagnetic interference (EMI) induced errors is added to the algorithm by latching the input variables LOW, HIGH, and the clocks (CLOCK A, CLOCK B) during a blanking interval around all power switch transitions, and creating a dead time between the turning-off of any active switching element and the turning-on of the other active switching element in each half bridge to avoid destructive shoot-through currents.

The sequence of switching elements closures required to implement the control algorithm of the present invention is illustrated in FIGS. 6a, 6b, 6c and 6d, respectively.

Figure 9:
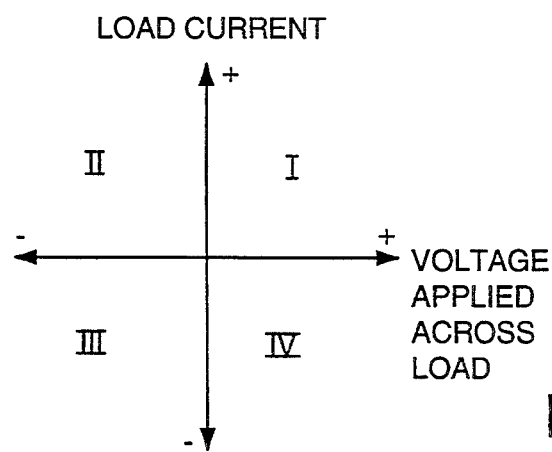
FIG. 9 shows the voltage and current polarities for each quadrant.

Since the sequence of switching elements closures is different in each quadrant, the timing is shown for each quadrant. Quadrants are defined as explained above and shown in FIG. 9 as follows:

If during a period the voltage applied across the load is positive, and the current through the load is positive, the period is defined as the first quadrant or quadrant I. This sequence occurs when putting energy into the load inductance and motoring on positive half-cycles of the output current waveform; if the load current is positive but the applied voltage across the load is negative, this sequence is defined as the second quadrant or quadrant II. This sequence occurs if energy is being taken out of the load inductance, or if the load is acting as a generator, in the positive half cycles of the output current waveform; if the voltage applied across the load is negative and the load current is also negative, this sequence is defined as the third quadrant or quadrant III. This sequence occurs if energy is being pumped into the load inductance and motoring in the negative half cycles of the output current waveform; if the applied voltage across the load is positive and the load current is negative, this sequence is defined as the fourth quadrant or quadrant IV. This sequence occurs when extracting energy from the load inductance or generating, on negative half cycles of the load current waveform. Normally the inverter moves in sequence from quadrant I to II to III to IV in each electrical cycle of motor operation.

Figure 10:
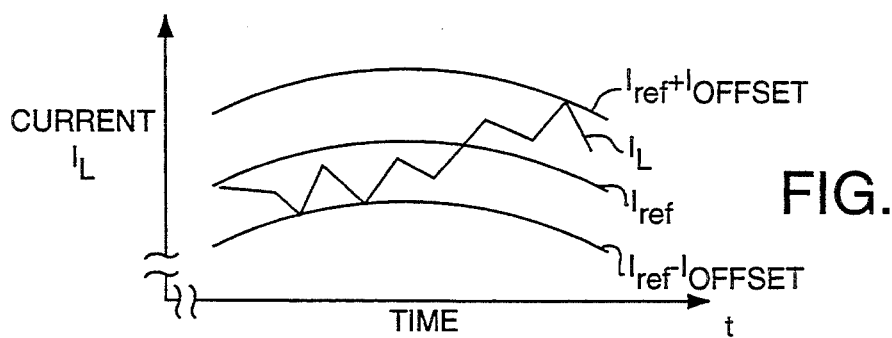
FIG. 10 shows a segment of the output current versus time waveform.

In FIGS. 6a-6d, each quadrant's timing is shown separately. Horizontal lines represent the state of the transistor switches S1–S4 and their respective antiparallel diodes. Vertical columns represent the state of the switches in successive logic states or time periods. The rectilinear graph shows if a switch S1–S4 or its antiparallel diode D1–D4 is conducting current or not; a "high" level indicates current is flowing through the diode, that is, the diode is conducting, and the switch is ON; otherwise the level is "low" and the switch is OFF and the diode is not conductive. FIG. 10 shows the resulting current vs. time waveform for a portion of the load current waveform.

Figure 6A:
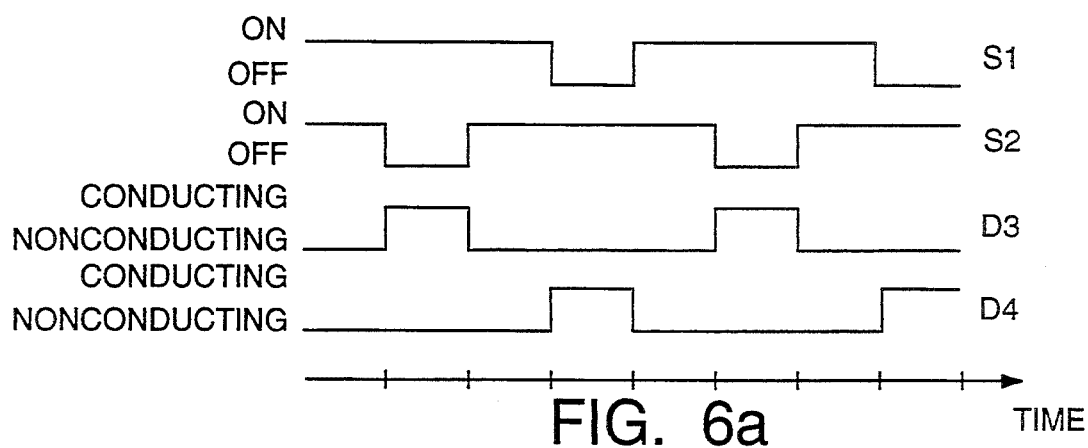
FIG. 6a shows the timing states of the switching elements and diodes in quadrant I.

Referring first to FIG. 6a, in the first time period the switches S1 and S2 are turned ON simultaneously to increase current to the load. In the next period, S2 turns OFF and the current is forced to flow through the antiparallel or flyback diode D3 across S3. During this time the load voltage is zero so the current decreases. Then switch S2 turns ON again, building up the current to the load again due to the positive DC bus voltage across the load. Then switch S1 turns OFF, forcing the current to flow through the antiparallel diode D4 across S4. This switching sequence repeats, with periods of both switches S1 and S2 ON, alternating with periods of time in which one or the other switch S1 and S2 is turned OFF, and the load current flows through the opposite diode.

The load inductance is key to this operation, since the inductance does not allow the load current to change instantaneously. For example, if S1 is turned OFF, the current flows through the diode D4 across switch S4. This means that although switch S4 is turned OFF, the current flows through S4's antiparallel diode D4 anyway. Switches S3 and S4 are never turned ON during quadrant I operation. FIG. 6d shows third quadrant operation in which switches S3 and S4 take the place of S1 and S2 for negative current flow.

Figure 6B:
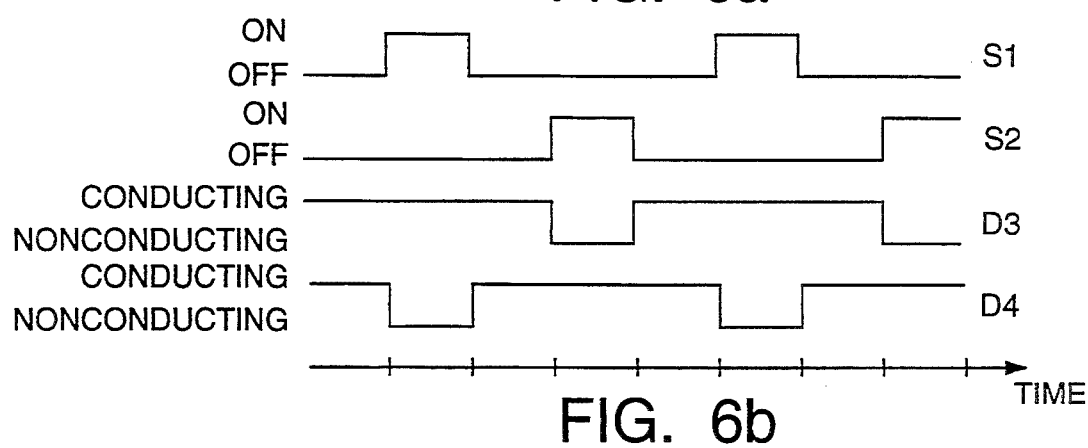
FIG. 6b shows the timing states of the switching elements and diodes in quadrant II.
Figure 6C:
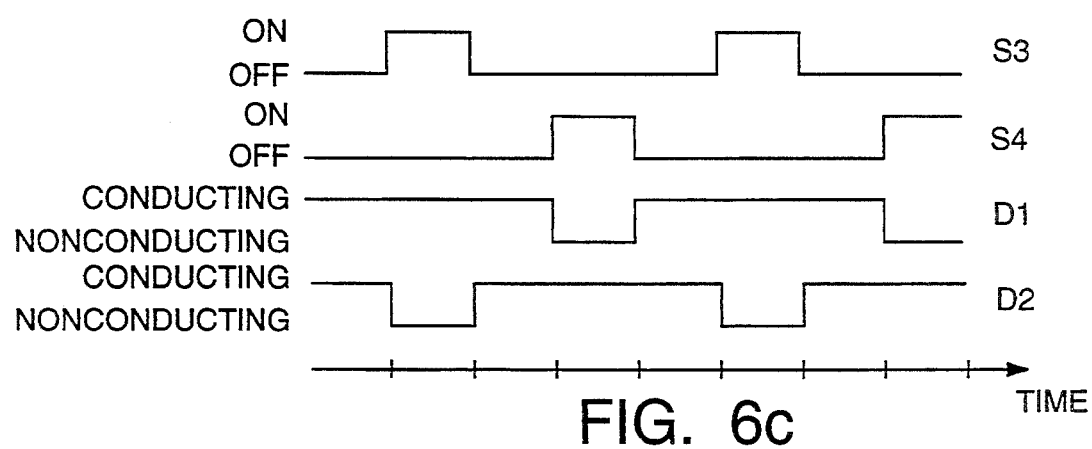
FIG. 6c shows the timing states of the switching elements and diodes in quadrant IV.
Figure 6D:
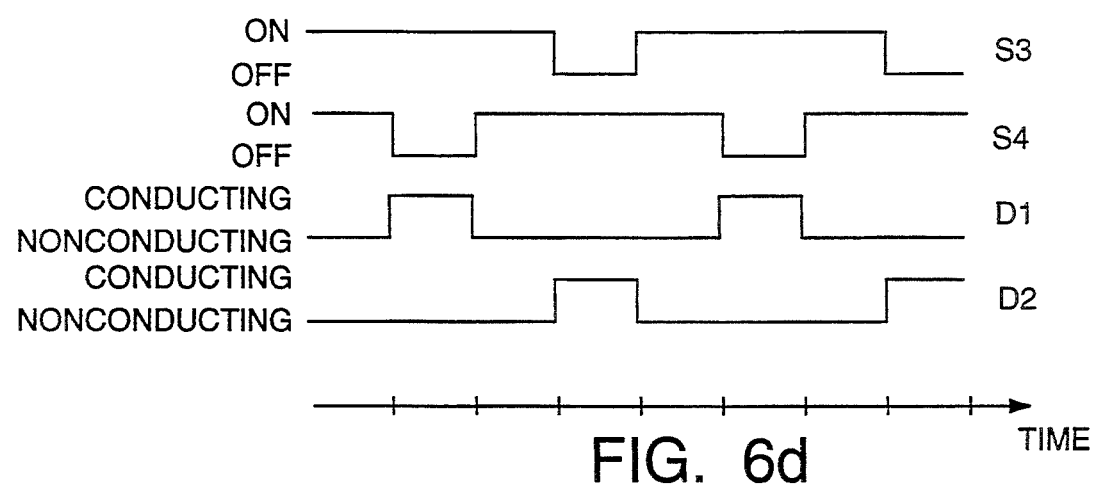
FIG. 6d shows the timing states of the switching elements and diodes in quadrant III.

In FIG. 6b, in the second quadrant, once a positive load current has been established, if all switches are OFF, the positive load current flows naturally through the antiparallel diodes D3 and D4 across switches S3 and S4, respectively even though these switches are turned OFF. This imposes the negative of the DC bus voltage across the load, and causes the current to be reduced. To avoid the current going to zero and ending the process, on alternate periods which the switches S1 or S2 are turned ON, which shorts out the load voltage to pump the current up again. In this mode the load is serving as an energy source, and the inverter is acting like a DC-to-DC boost converter pumping energy back into the DC bus. Switches S3 and S4 are never turned ON in quadrant II operation. FIG. 6c shows fourth quadrant operation, in which switches S3 and S4 take the place of switches S1 and S2.

It can be seen therefore from the foregoing that the changes of state of the control variables are easily derived from a comparison of the desired current values within the defined band and the measured bridge performance that is the actual current value. Those skilled in the art will readily observe that the algorithm is robust and always converges rapidly to the desired operating condition. It can also be seen that an erroneous control decision made due to noise or other circumstances is limited in scale and is quickly corrected due to the operation of the algorithm.

The following describes a more error-resistant form of the algorithm which uses enable latches to avoid a state transition unless a specific sequence of events occurs. For purposes of explanation and illustration of this form of the control algorithm, the following additional definitions and conventions are adopted. HIAE is defined as the enable latch for a synchronous transition to DIR=1. LOAE is defined as the enable latch for asynchronous transition to DIR=0. RDY+ is defined as the enable latch for transition to VMODE=1. RDY− is defined as the enable latch for transition to VMODE=0. The use of these protective features avoids accidental "bang-bang" asynchronous operation at too high a frequency if the band 10 is too small for any reason, and avoids accidental VMODE changes during sudden transitions in reference levels. The enhanced more error-resistant form of the control algorithm is slightly more complicated and is represented by the following expressions:

6.) Set DIR=0 only if (HIAE*HIGH+CLOCKB&-LOW \ )

7.) Set DIR=1 only if (LOAE*LOW+CLOCKA*-HIGH \ )

8.) Set HIAE=0 if LOAE*LOW

9.) Set LOAE=0 if HIAE*HIGH

10.) Set HIAE=1 if CLOCKA

11.) Set LOAE=1 if CLOCKB

12.) Set RDY+=VMODE \ on CLOCKA, reset if HIGH

13.) Set RDY−=VMODE on CLOCKB, reset if LOW

14.) Set VMODE=1 on CLOCKB only if RDY+

15.) Set VMODE=0 on CLOCKA only if RDY−

Either portion of the protective features of the enhanced algorithm represented by expressions 6–11 or expressions 12–15 may be added to the control algorithm described above with or without the other portion.

The control algorithm of the present invention may be implemented by the use of any of the following techniques which are well known to those skilled in the art: discrete IC logic components and comparators; programmable logic array; microprocessor program; application specific integrated circuit (ASIC); or, by any other logic processing structure. Preferred embodiments use a combination of discrete IC comparators and a programmable logic array.

Figure 7:
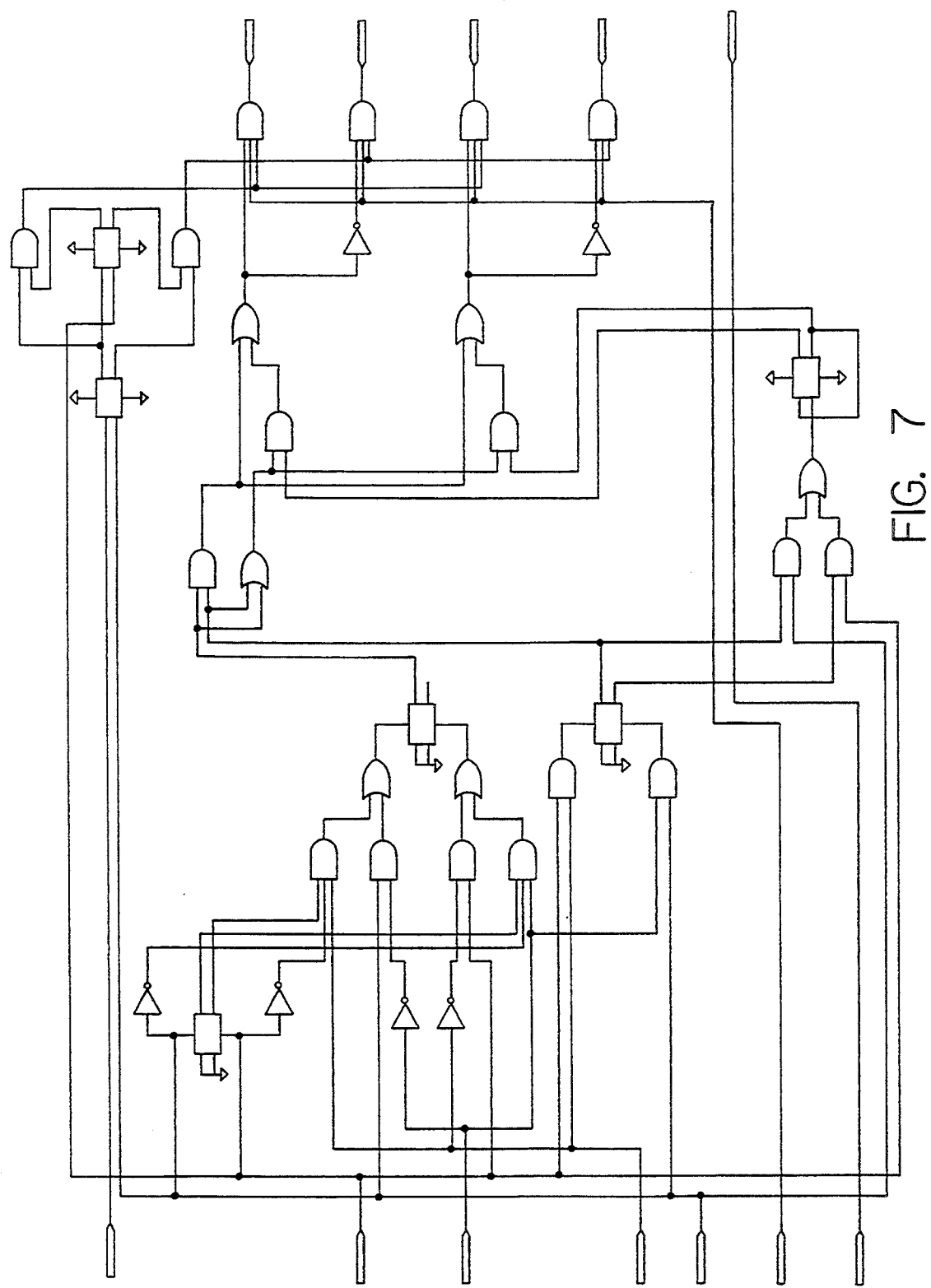
FIG. 7 is a logic circuit implementation of the control algorithm of the present invention using a current band.

A first preferred embodiment is represented by the necessary logic diagrams as illustrated in FIG. 7, the operation of which logic will be readily understood by those skilled in the art and therefore not described in detail in this disclosure. The logical operations represented by the logic of FIG. 7 are entered into a programmable logic array for use in controlling a motor drive. In this embodiment, the switching elements of the bridge are implemented by insulated gate bipolar transistors (IGBT). As known in the motor drive art, the bridges are associated one-for-one to drive a respective coil in a brushless DC motor. The current reference Iref is generated by using the shaft position encoder to generate a desired current waveform in each coil. The desired current waveform characteristic is stored in a read-only memory (ROM) as a function of shaft position. The stored characteristic is scaled by the desired current magnitude in a control loop and the switching function instruction set is implemented in a microprocessor. Two new current reference signals are derived from Iref, defined as Ip and In, by respectively adding and subtracting a band gap value AI to/from the desired waveform Iref. The band gap value AI can also be referred to as an offset current AI added to and subtracted from the Iref value resulting in $I_p$ and $I_n$, respectively. The actual measured value of the load current $I_L$ is then compared with these two reference signals resulting in two logic signals defined as CP=I->Ip and CN=I<In. The logic signals CP and CN are applied to the logic circuitry of FIG. 7 along with Clock pulses CLKA and CLKB. The clock pulses have a frequency of 30 KHZ and are shifted in time phase by 180 degrees. The resulting digital switch signals S1, S2, S3, and S4 are used to gate the power switches of the bridge.

Figure 11:
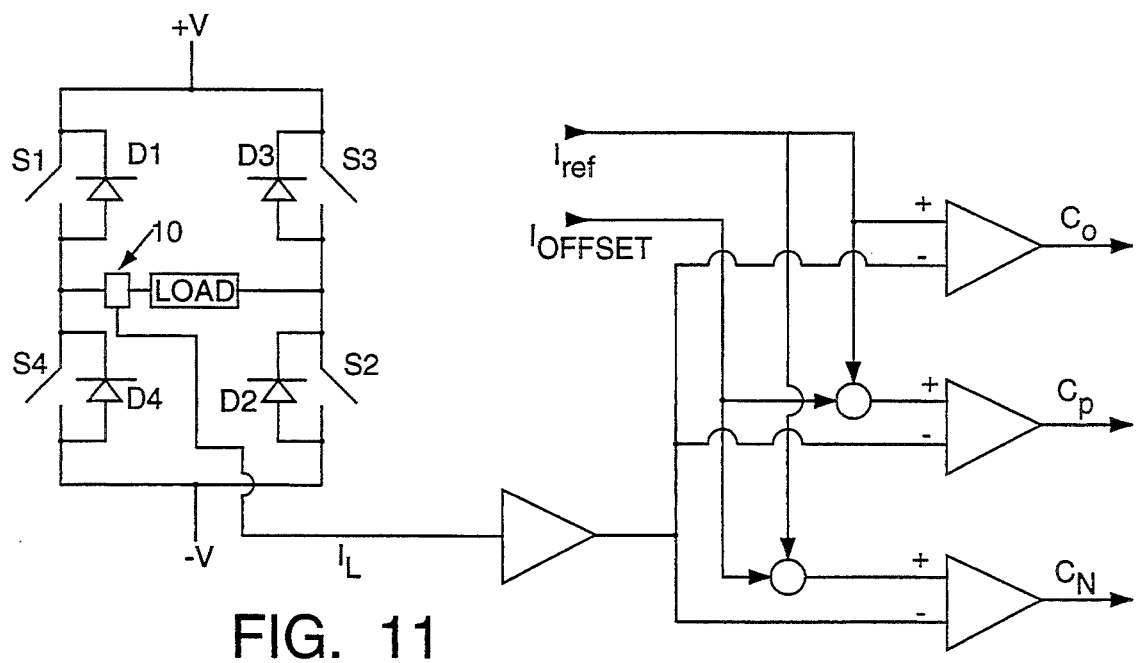
FIG. 11 is a logic circuit for generating the logic signals used with the logic circuit implementations of the invention shown in FIGS. 7 and 8.

A simple logic circuit implementation to derive the logic signals CP and CN is illustrated in FIG. 11 and is based on the foregoing explanation and figures. The logic circuit is obvious to those skilled in the art. As illustrated in FIG. 11, a current sensor 10 is used to measure the load current I in a H-bridge such as shown in FIG. 1. The current sensor may be shown schematically as a small resistor in series with the load and an amplifier. A preferred embodiment of a current sensor is a current measuring device based on the Hall effect. Such Hall effect current sensors are commercially available from many sources such as NANA, Inc. The sensed load current $I_L$ signal is amplified and compared with the current reference Iref to produce a logic signal C0; $I_L$ is compared with the current reference Iref plus the offset ΔI to produce logic signal CP; and the current $I_L$ is compared with the Iref minus the offset ΔI to produce logic signal CN. The waveform current levels shown in FIG. 5 represent the current reference Iref, the Iref plus the offset ΔI designated 12, and the Iref minus the offset ΔI designated 10, with the range of values between the two extremes representing the band of allowed current values. The resulting logic signals are processed by the digital elements in FIG. 7 or FIG. 8 below to produce the power transistor switch control signals, with the convention that a logic "1" means the switch is turned ON.

Figure 8:
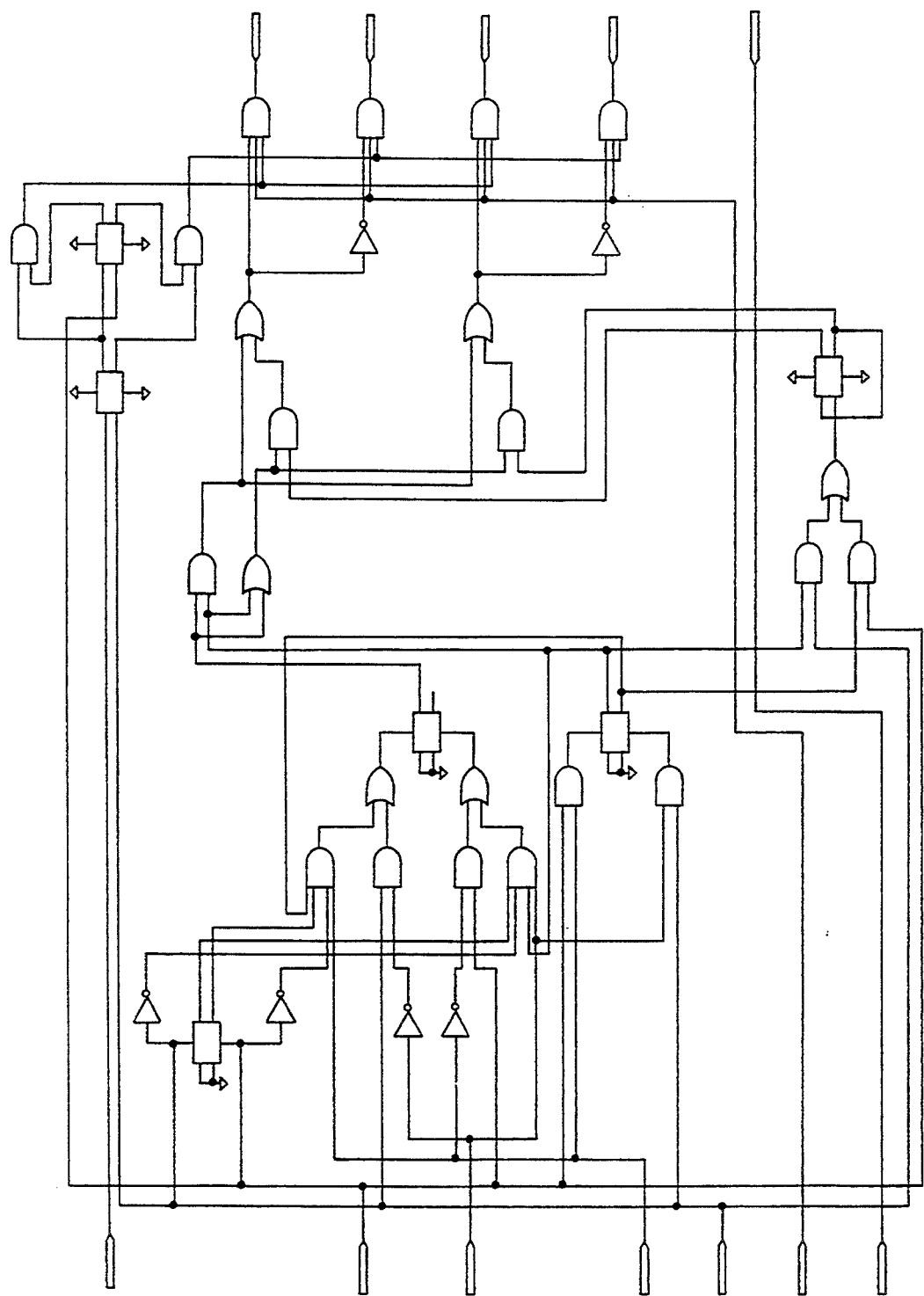
FIG. 8 is a logic circuit implementation of the control algorithm of the present invention without a current band.

A second preferred embodiment represented by the logic diagrams as illustrated in FIG. 8 differs from the first preferred embodiment of FIG. 7 in that no current band gap is needed which reduces the number of reference signals required to Iref alone. The number of comparators is also reduced since CN=CP \. As in the case of FIG. 7, the operation of the logic of FIG. 8 will be readily understood by those skilled in the art. The resulting waveform current I in this case approximates Iref as closely as the current ripple I allows. Although the embodiment of FIG. 7 using a current gap results in a better prediction of the waveform during zero crossings, the embodiment of FIG. 8 without the current gap is simpler.

The pulse width modulator (PWM) is controlled with the control algorithm of the present invention to force the actual motor coil current waveform to approximate the desired reference current waveform. The approximation is successful as long as the desired current waveform does not violate the limitations of current slew rate or control loop bandwidth. If these limits are exceeded, the actual current follows the desired input at the best rate possible.

The invention claimed is:

1. A four quadrant unipolar pulse width modulated (PWM) power conversion circuit for supplying a desired current to an inductive load and for maintaining the desired current within a bandgap defined by adding a predetermined offset current magnitude to the desired current magnitude to define an upper boundary current magnitude and subtracting said predetermined offset current magnitude from the desired current magnitude to define a lower boundary of the gap, said circuit comprising:

an H-bridge circuit topology having:
an upper pair of switching elements and a lower pair of switching elements, a first upper switching element S1 coupling a first terminal of said load to a positive potential of a DC power source and a second upper switching element S3 coupling a second terminal of said load to said load to said positive potential of said power source;
a first lower switching element S4 coupling said first terminal of said load to a negative potential of a DC power source and a second lower switching element S2 coupling said second terminal of said load to said negative potential of said power source;
first diode means in parallel with said first upper switching element S1 and having its anode terminal connected to said first terminal of said load and its cathode terminal connected to said DC power source positive potential;
second diode means in parallel with said second upper switching element S3 and having its anode terminal connected to said second terminal of said load and its cathode terminal connected to said DC power source positive potential;
third diode means in parallel with said first lower switching element S4 and having its cathode terminal connected to said first terminal of said load and its anode terminal connected to said DC power source negative potential;
fourth diode means in parallel with said second lower switching element S2 and having its cathode terminal connected to said second terminal of said load and its anode terminal connected to said DC power source negative potential;
a means for generating a first set of timing pulses defined as CLOCK A with each pulse corresponding to a logical 1;
a means for generating a second set of timing pulses defined as CLOCK B with each pulse corresponding to a logical 1 and each pulse shifted 180 degrees with respect to the timing pulses of said CLOCK A;
current sensing means serially connected to said load for generating signals indicative of the magnitude and direction of the current flowing through said load;
means for logically deriving signals indicative of a voltage imposed across said load;

means for generating signals indicative of a comparison of the sensed load current signals with signals indicative of the desired load current, and control means electrically coupled to said switching elements S1–S4 and receiving said timing pulses, said load voltage signals and said load comparison signals, said control means including means for generating a first set of switching element control signals to cause said first upper switching element S1 and said second lower switching element S2 to become conductive to provide a current path through said load in a first direction;

a second set of switching element control signals to cause said second upper switching element S3 and said first lower switching element S4 to become conductive to provide a current path through said load in a second direction;

a third set of switching element control signals to cause said first and second switching elements to become conductive to create a short circuit across said load by creating a current path from said positive potential through said conductive one of said first and second upper switching elements through said load, through said respective diode means in parallel with the non-conductive one of said first and second upper switching elements, said diodes being forward biased to return to said positive potential, and a fourth set of switching element control signals to cause one of said first and second lower switching elements to become conductive to create a short circuit across said load by creating a current path from said negative potential through said conductive one of said first and second lower switching elements, through said load, through said respective diode means in parallel with the non-conductive one of said first and second lower switching elements, said diode means being forward biased to return to said negative potential, said switching element control signal sets to selectively operate each of said switching elements S1–S4 between a conducting (logical 1 or high) and a nonconducting (logical 0 or low) state;

said control means further comprising an active current controller for selecting a one of said control signal sets and setting the state of each of said switching elements S1–S4, respectively, given by the following expressions:

S1=IPOL*(DIR*VMODE+OA*(DIR+-VMODE));

S2=IPOL*(DIR*VMODE+OA\*(DIR+-VMODE));

S3=IPOL\*((DIR*VMODE+OA\*(DIR+-VMODE))\);

S4=IPOL\*((DIR*VMODE+OA*(DIR+-VMODE))\);

wherein DIR=1 corresponds to increasing magnitude load current and DIR=0 to decreasing magnitude load current, IPOL=1 corresponds to a positive load current and IPOL=0 corresponds to a negative load current, OA=1 corresponds to an electrical short of said load with switching elements S1 and S3 operated and OA=0 corresponds to an electrical short of said load with switching elements S2 and S4 operated, such that the current through the load is changed to decrease in magnitude if rising and either the upper boundary is reached or CLOCK B=1 and changed to increase in magnitude if decreasing and either the lower boundary is reached or CLOCK A=1, and wherein VMODE=1 corresponds to a positive voltage polarity impressed across the load and VMODE=0 corresponds to a negative voltage polarity impressed across the load such that the voltage across the load is changed to a positive polarity if the lower current boundary is reached and CLOCK B=1 and is changed to a negative polarity if the upper current boundary is reached and CLOCK A=1, thereby causing the instantaneous voltage across the load to alternate between a single polarity voltage and zero for a portion of the output waveform across said load to cause said average value of said load current to correspond generally with said desired average load current.

2. A four quadrant unipolar PWM power conversion circuit as defined in claim 1 further comprising said control means generating a fifth set of switching element control signals to cause said second upper switching element S3 and said first lower switching element S4 to become conductive to provide a current path through said load in a second direction opposite to said first direction.

3. A four quadrant unipolar PWM power conversion circuit as defined in claim 1 wherein said control means activates said switching elements in sequence wherein said third and fourth set of switching element control signals are alternately applied with respect to one another and one or the other of said third and fourth set of controls signals is applied each time said first set of switching element control signals are applied to distribute substantially evenly among said switching elements the dissipation of heat generated due to switch transitions.

4. A four quadrant unipolar PWM power conversion circuit as defined in claim 1 further including said PWM power conversion circuit operating in a fixed frequency pulse width modulated mode.

5. A four quadrant unipolar PWM power conversion circuit as defined in claim 1 wherein said instantaneous load voltage automatically shifts from a first single polarity voltage to a second single polarity voltage in response to a control signal representative of the difference between the value of said desired average load current and said actual average load current.

6. A four quadrant unipolar PWM power conversion circuit as defined in claim 1 wherein said switching element control signals are input through corresponding enable latches to prevent unintentional state transitions of said first and second upper switching elements S1 and S3 and said first and second lower switching elements S2 and S4, respectively.

* * * * *